US010566779B2

United States Patent
Lavertu et al.

(10) Patent No.: US 10,566,779 B2
(45) Date of Patent: Feb. 18, 2020

(54) EXTERNAL DC OVERCURRENT ELECTRONIC TRIP UNIT FOR CIRCUIT BREAKER

(71) Applicant: Bombardier Transportation GmbH, Berlin (DE)

(72) Inventors: Carl Lavertu, Beloeil (CA); Maxime Berger, Longueuil (CA)

(73) Assignee: Bombardier Transportation GmbH, Berlin (DE)

( * ) Notice: Subject to any disclaimer, the term of this patent is extended or adjusted under 35 U.S.C. 154(b) by 397 days.

(21) Appl. No.: 15/606,145

(22) Filed: May 26, 2017

(65) Prior Publication Data

US 2018/0076612 A1    Mar. 15, 2018

Related U.S. Application Data

(60) Provisional application No. 62/344,444, filed on Jun. 2, 2016.

(51) Int. Cl.
*H02H 3/08*    (2006.01)
*H02H 3/087*   (2006.01)
(Continued)

(52) U.S. Cl.
CPC .......... *H02H 3/087* (2013.01); *H01H 33/596* (2013.01); *H02H 1/0092* (2013.01);
(Continued)

(58) Field of Classification Search
CPC ....... H02H 3/087; H02H 3/093; H01H 33/596
See application file for complete search history.

(56) References Cited

U.S. PATENT DOCUMENTS 8,014,115 B2 * 9/2011 Vicente .................... H02H 7/30
                                                    361/93.1
10,218,167 B2 * 2/2019 Franke ................. H02H 3/0935
(Continued)

FOREIGN PATENT DOCUMENTS

EP    2320535 B1    9/2013
WO    2006060830 A1    6/2006

OTHER PUBLICATIONS

"Coordination of Low Voltage Circuit Breakers Chapter 6 of P1015—Blue Book by P.S.P. Low Voltage Protection Committee", ED-Institute of Electrical and Electronics Engineers, Proceedings of the Industrial and Commercial Power Systems Technical Conference. Pittsburgh, May 4-7, 1992; [Proceedings of the Industrial and Commercial Power Systems Technical Conference], New York, IEEE, US, vol. - , May 4, 1992 pages 1-9, XP000315141, ISBN: 978-0-7803-0707-0.

*Primary Examiner* — Scott Bauer
(74) *Attorney, Agent, or Firm* — The Webb Law Firm

(57) ABSTRACT

Disclosed is a DC circuit breaker including at least one contact configured to be coupled between a source of DC power and a DC load and a method of controlling the closed and open state of the contact. The DC circuit breaker includes a thermomagnetic trip circuit and an electronic trip circuit. The electronic trip circuit is responsive to a sensed level of DC current flowing in the contact in a closed state for accumulating an indication of the total time the DC current is sensed. The accumulated indication of the total time the DC current is sensed is compared to a predetermined value or level and, in response to the accumulated indication exceeding the predetermined value or level, the contact is caused to switch from a closed state to an open state.

12 Claims, 11 Drawing Sheets

(51) Int. Cl.
*H01H 33/59* (2006.01)
*H02H 3/093* (2006.01)
*H02H 1/00* (2006.01)
*H02H 3/10* (2006.01)
*H02M 3/335* (2006.01)

(52) U.S. Cl.
CPC .............. *H02H 3/093* (2013.01); *H02H 3/10* (2013.01); *H02M 3/33507* (2013.01)

(56) References Cited

U.S. PATENT DOCUMENTS

| | | | |
|---|---|---|---|
| 2009/0225483 A1* | 9/2009 | Veroni | H02H 3/0935 361/93.2 |
| 2016/0049263 A1* | 2/2016 | Maloney | H01H 3/04 335/21 |

\* cited by examiner

EXTERNAL DC OVERCURRENT ELECTRONIC TRIP UNIT FOR CIRCUIT BREAKER

CROSS REFERENCE TO RELATED APPLICATION

This application claims the benefit of U.S. Provisional Application No. 62/344,444, filed Jun. 2, 2016, the contents of which are incorporated in their entirety herein by reference.

BACKGROUND OF THE INVENTION

Field of the Invention

The present invention relates to DC circuit breakers found, for example, on rapid transit trains, and, more particularly, to an apparatus and method for controlling the closed and open states of the DC circuit breaker in a time-domain dependent manner.

Description of Related Art

Rapid transit systems are widely used for high-volume passenger transportation. Rail passenger train DC auxiliary subsystems are supplied power by a low voltage power supply (LVPS) at a voltage that typically varies between 24 volts and 110 volts. Batteries are also used to support important and essential loads under emergency conditions. An advantage of using DC power versus AC power is the possibility to distribute variable-frequency drives near the loads without any AC-to-DC conversion. DC auxiliary subsystems and DC distribution in aircrafts, on manned aerial vehicles, shipboards, commercial and industrial buildings, as well as data centers is being widely developed. Fault protection in DC systems is still a subject of broad interest due to the lack of standards compared to AC systems.

Circuit breakers are often preferred to fuses in railway vehicles because the latter shown thermal fatigue, cannot be controlled remotely, do not provide a means to easily isolate circuits during maintenance, and need to be replaced. Circuit breakers widely in use in railway vehicles include a thermomagnetic trip circuit. The rating of such circuit breakers is selected to be high enough to avoid false trip during emergency and maximum operating temperature conditions. However, under cold temperature conditions, especially outdoor rapid transit systems, the effectiveness of the thermomagnetic trip circuit, especially in the thermal region, is reduced. Moreover, the available fault current tolerance is generally limited. Because of ratings and tolerances on the trip curves of commercially available circuit breakers that include thermomagnetic trip circuits, it is possible during a short circuit, e.g., a short between the positive and the negative lines of a low voltage bus, that the trip curve will fall into the thermal zone such that the fault may last for many seconds, leading to hazardous conditions.

SUMMARY OF THE INVENTION

Disclosed herein is, among other things, a circuit breaker that includes the combination of a prior art thermomagnetic trip circuit in combination with a shunt trip coil operating under the control of an electronic trip circuit in accordance with the examples described herein. The use of the electronic trip circuit in combination with the thermomagnetic trip circuit aids in the rapid detection of a fault current and the opening of one or more contacts of the circuit breaker more rapidly than the thermomagnetic trip circuit alone. The combination of the thermomagnetic trip circuit and the electronic trip circuit increases the protection performance of the circuit breaker against fault conditions appearing on the voltage bus lines.

Various preferred and non-limiting examples of the present invention will now be described and set forth in the following numbered clauses:

Clause 1: A DC circuit breaker includes at least one contact configured to be coupled between a source of DC power and a DC load. A thermomagnetic trip circuit is operable in accordance with a first time-current curve that defines: a first time-current region (1TCR) where the contact, starting in a closed state, remains in the closed state in response to the contact being exposed to a combination of current and time in the 1TCR, and a second time-current region (2TCR) where the contact, starting in the closed state, switches to an open state in response to the contact being exposed to a combination of current and time in the 2TCR. An electronic trip circuit is operable in accordance with a second time-current curve that defines a third time-current region (3TCR) where the contact, starting in the closed state, remains in the closed state in response to the contact being exposed to a combination of current and time in the 3TCR, and a fourth time-current region (4TCR) where the contact, starting in the closed state, switches to the open state in response to the contact being exposed to a combination of current and time in the 4TCR. Each combination of current and time comprises a total time that DC current flows in the contact and a level of the DC current flowing in the contact at said total time.

Clause 2: The DC circuit breaker of clause 1, wherein at least a part of the 1TCR and a part of the 4TCR overlap and have time-current pairs or points in common.

Clause 3: The DC circuit breaker of clause 1 or 2, further including a current sensor configured to sense the DC current flowing in the contact, wherein the electronic trip circuit includes a controller responsive to an output of the current sensor for determining that at least one combination of current and time falls in the 4TCR.

Clause 4: The DC circuit breaker of any one of clauses 1-3, wherein the controller is responsive to determining that said at least one combination of current and time falls in the 4TCR for causing the contact to switch from the closed state to the open state.

Clause 5: The DC circuit breaker of any one of clauses 1-4, wherein the electronic trip circuit includes: a converter configured to convert DC voltage on the DC bus to a different level DC voltage; and an energy storage for storing DC power at the different level DC voltage for use by the controller.

Clause 6: The DC circuit breaker of any one of clauses 1-5, wherein the controller includes a time over current detect circuit which determines, based on the output of the current sensor, that the level of the DC current flowing in the contact exceeds a predetermined level and the total time that must accumulate before the combination of current and time is in the 4TCR.

Clause 7: The DC circuit breaker of any one of clauses 1-6, wherein the controller includes a level detector configured to detect when the sensed DC current exceeds a predetermined maximum level and, in response thereto, to cause the contact to switch from the closed state to the open state.

Clause 8: A method of controlling a DC circuit breaker comprising: (a) sensing a level of DC current flowing in at least one contact of the DC circuit breaker in a closed state; (b) accumulating an indication of the total time the DC current in step (a) is sensed; (c) comparing the accumulated indication in step (b) to a predetermined value or level; and (d) in response to the accumulated indication in step (b) exceeding the predetermined value or level, causing the at least one contact to switch from the closed state to an open state.

Clause 9: The method of clause 8, wherein the accumulated indication is an accumulated charge on a capacitor.

Clause 10: The method of clause 8 or 9, wherein the capacitor is charged with current from a current source and the value of the charging current is based on the level of the DC current sensed in step (a).

Clause 11: The method of any one of clauses 8-10, wherein step (b) includes accumulating the indication of the total time the DC current in step (a) is sensed only when the level of the DC current exceeds a predetermined value.

Clause 12: The method of any one of clauses 8-11, wherein at least one of steps (b), (c), and (d) is performed under the control of a programmed digital controller.

Clause 13: The method of any one of clauses 8-12, wherein the programmed digital controller includes one of the following operating under the control of computer readable program code: a microprocessor; or a digital signal processor (DSP).

Clause 14: The method of any one of clauses 8-13, further including: causing the at least one contact to switch from the closed state to the open state in response to a temperature of the DC circuit breaker exceeding a predetermined temperature.

Clause 15: The method of any one of clauses 8-14, further including: causing the at least one contact to switch from the closed state to the open state in response to a magnetic field produced by the DC current flowing in at least one contact exceeding a predetermined value.

DESCRIPTION OF THE INVENTION

Figure 1:
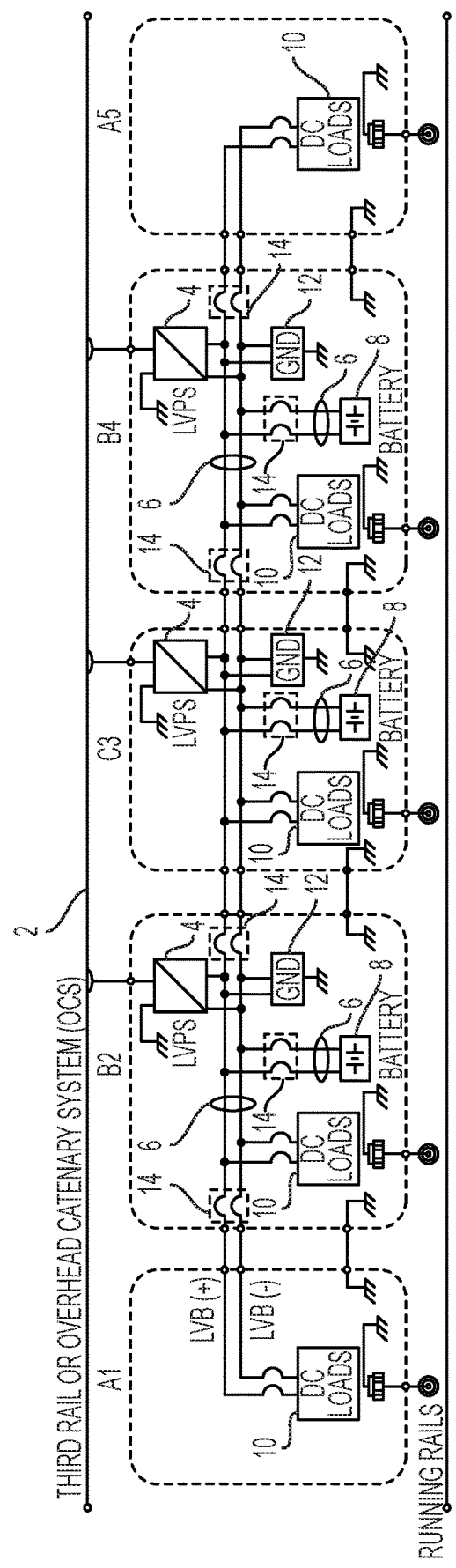
FIG. 1 is a diagrammatic drawing of a five car rapid transit train including a low voltage bus running between the cars that is powered by low voltage power supplies (LVPS) and batteries for supplying electrical power to DC loads distributed throughout the cars and including DC circuit breakers to protect against fault conditions, such as a short circuit, that may appear on the low voltage bus.

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example (s) illustrated in the attached drawings, and described in the following specification, are simply exemplary examples or aspects of the invention. Hence, the specific examples or aspects disclosed herein are not to be construed as limiting.

With reference to FIG. 1, an example rapid transit train can include cars A1, B2, C3, B4, and A5. In an example, car A1 can be the lead car and car A5 can be the trailing car. Any one or number of the cars can include a propulsion system that can be operated in a manner known in the art to provide motive force to the train to move along running rails or other closed pathway. The rapid transit train can also include a DC auxiliary power system that receives power from a third rail or overhead catenary system 2 (hereinafter "third rail").

The train shown in FIG. 1 can include one or more low voltage power supplies (LVPS) 4 which operate in a manner known in the art to step down the high voltage DC power supplied by third rail 2 to a lower voltage supplied to a low voltage bus 6 that runs between the cars of the train. In the illustrated example, cars B2, C3, and B4 each include LVPS 4 and cars A1 and A5 do not. However, this is not to be construed in a limiting sense since each car may or may not include an LVPS 4 depending on, for example, the need for an LVPS 4 in said car.

The train can also include a number of batteries 8 for storage of DC power supplied on the low voltage bus 6. In an example, low voltage bus 6 can be a 32.5 volt DC bus. However, this is not to be construed in a limiting sense. Moreover, in the illustrated example, cars B2, C3, and B4 include batteries 8 and cars A1 and A5 do not. However, this is not to be construed in a limiting sense since each car may or may not include a battery 8 as deemed suitable and/or desirable by the application.

In an example, each car can include one or more DC loads 10 coupled to low voltage bus 6 in parallel with the one or more batteries 8 and the one or more LVPS 4. The train can further include one or more ground fault detection circuits 12 coupled to low voltage bus 6. In the illustrated example, cars B2, C3, and B4 include ground fault detection circuits 12. However, the number and distribution of ground fault detection circuits in the cars of the example train shown in FIG. 1 can be determined by one of ordinary skill in the art.

In an example, the train shown in FIG. 1 can also include a number of DC circuit breakers 14 distributed at strategic locations on low voltage bus 6 and in-line with each battery 8. In the example train shown in FIG. 1, DC circuit breakers 14 are disposed on low voltage bus 6 on each end of cars B2 and B4. Moreover, a DC circuit breaker is positioned in-line with each battery 8. However, the positions of DC circuit breakers 14 in the train shown in FIG. 1 are not to be construed in a limiting sense.

Figure 2:
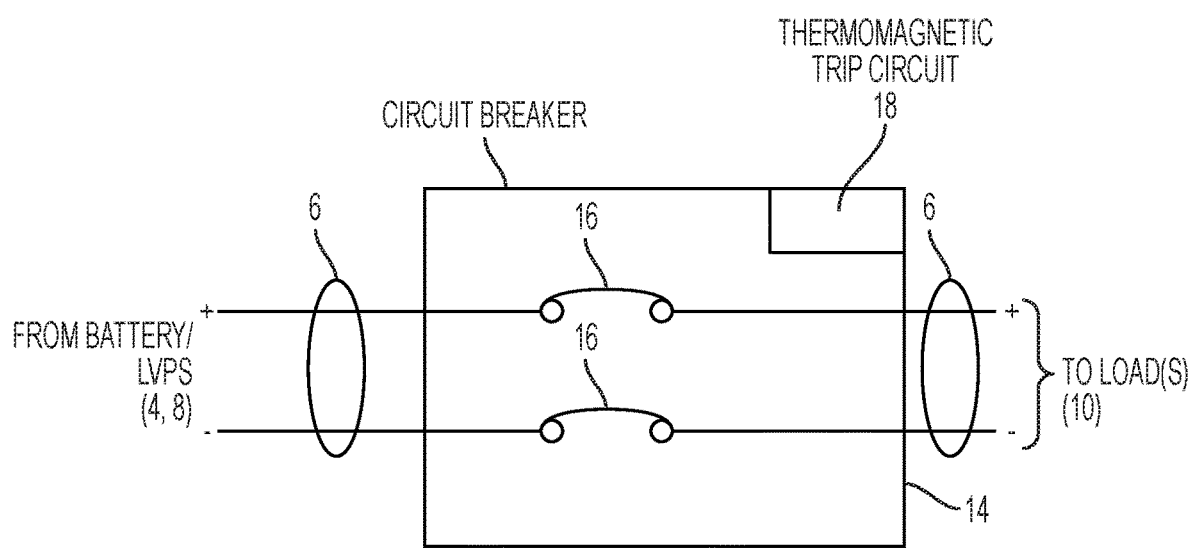
FIG. 2 is a schematic drawing of a prior art circuit breaker including a thermomagnetic trip circuit.

With reference to FIG. 2 and with continuing reference to FIG. 1, each circuit breaker 14 includes one or more contacts 16 (hereinafter "the contact(s) 16") operating the control of a thermomagnetic trip circuit 18 of circuit breaker 14 which is operative for controlling the open and closed state of the contact(s) 16 in a manner known in the art. Specifically, thermomagnetic trip circuit 18 is configured to control the open and closed states of the contact(s) 16 under tripping conditions, namely, thermal and magnetic, which can act independently of each other.

Under the thermal trip condition, the release of contact(s) 16 from a closed to an open state varies inversely with the current flowing through the circuit breaker. The thermal trip region is intended for protection against continuous overload while allowing momentary current surges. A relatively large tolerance on detection time is generally specified due to operating temperature impact on the actual thermal detection mechanism (not shown).

In a magnetic trip condition, the release delay of the contact(s) 16 from a closed state to an open state is constant when the current flowing is beyond the instantaneous current trip value. This trip mechanism is intended for protection against short-circuit. Circuit breaker 14, including thermomagnetic trip circuit 18 for controlling the release of one or more contacts from a closed state to an open state, is well known in the art.

Figure 3:
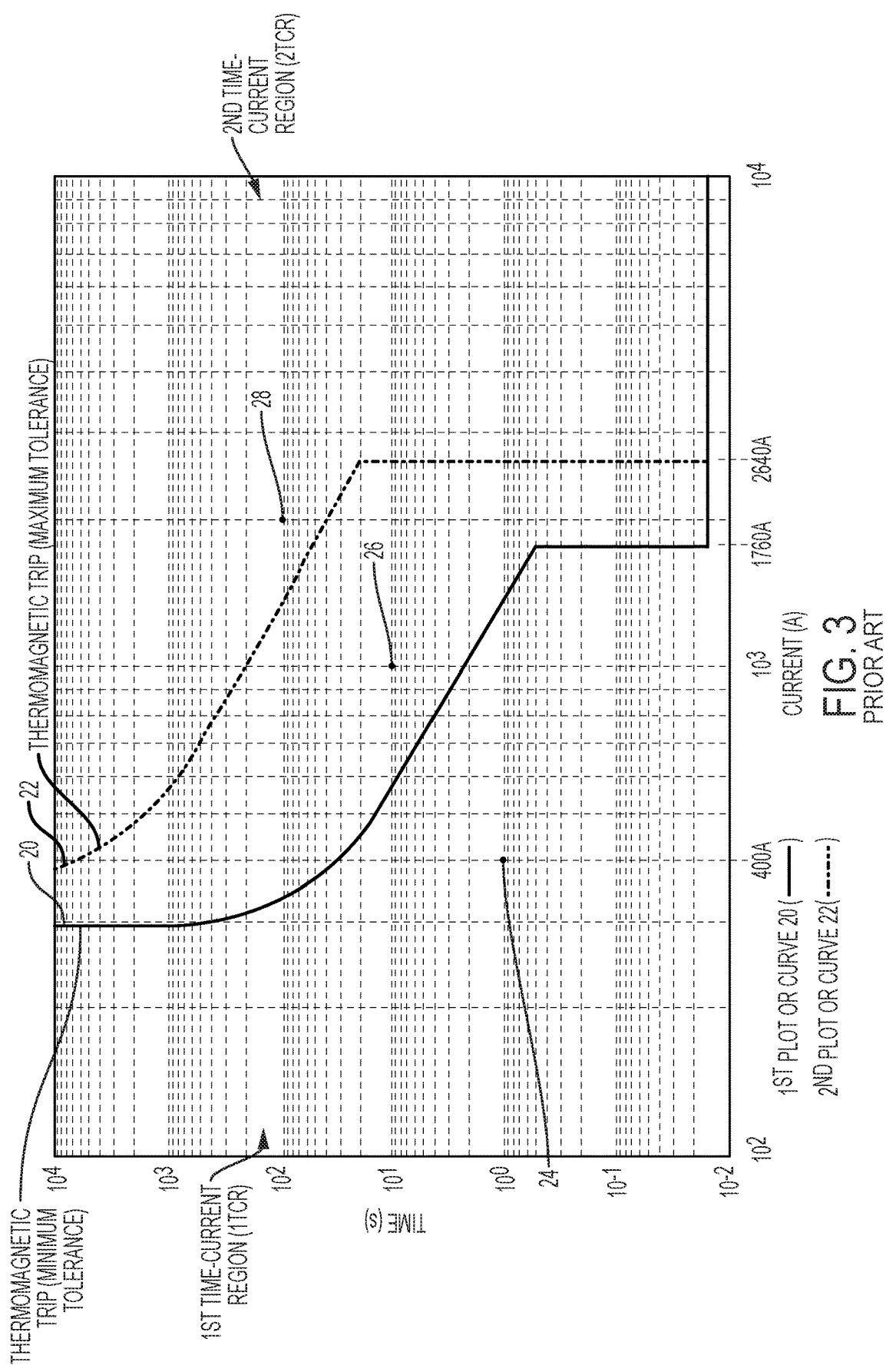
FIG. 3 is a log-log graph of current versus time including first and second example plots of minimum and maximum tolerance operation of the example circuit breaker of FIG. 2.

With reference to FIG. 3 and with continuing reference to FIGS. 1 and 2, example log-log plots of current versus time of circuit breaker 14, including thermomagnetic trip circuit 18, includes a first example plot 20 that represents an example minimum tolerance of thermomagnetic trip circuit 18 and second example plot 22 that represents an example maximum tolerance of thermomagnetic trip circuit 18.

Referring to first plot 20, the range of current from approximately 300 amps to 1,760 amps represents the thermal trip region of thermomagnetic trip circuit 18 while above 1,760 amps represents the magnetic trip region of thermomagnetic trip circuit 18. Referring to second plot 22, between about 400 amps and 2,640 amps represents the thermal trip region of thermomagnetic trip circuit 18 while above 2,640 amps represents the magnetic trip region of thermomagnetic trip circuit 18. For each of the first plot 20 and second plot 22, the area of the time-current region to the left of said plot (including the thermal trip region of said plot) represents a first time-current region (1TCR) while the area to the right of said plot (including the magnetic trip region) represents a second time-current region (2TCR). For example, with respect to first plot 20, point 24 (400 amps, 1 second) is in the 1TCR (and in the thermal trip region) of first plot 20 while point 26 (1,000 amps, 10 seconds) is in the 2TCR (also in the thermal trip region) of first plot 20. With respect to second plot 22, point 26 is in the 1TCR (the thermal trip region) of second plot 22 while point 28 (2,000 amps, 100 seconds) is in the 2TCR (also in the thermal trip region) of second plot 22.

The large difference between minimum tolerance (first plot 20) and maximum tolerance (second plot 22) of the thermomagnetic trip circuit 18 may be unacceptable in the environment of the train shown in FIG. 1. This is because in the event of a fault current, e.g., a short circuit between the positive and negative lines of low voltage bus 6, the current flowing through the short circuit and, hence, on low voltage bus 6 can fall into the thermal region of the thermomagnetic trip circuit 18 and may last for several seconds, leading to a hazardous condition.

Having described the prior art, the present invention will now be described.

Figure 4:
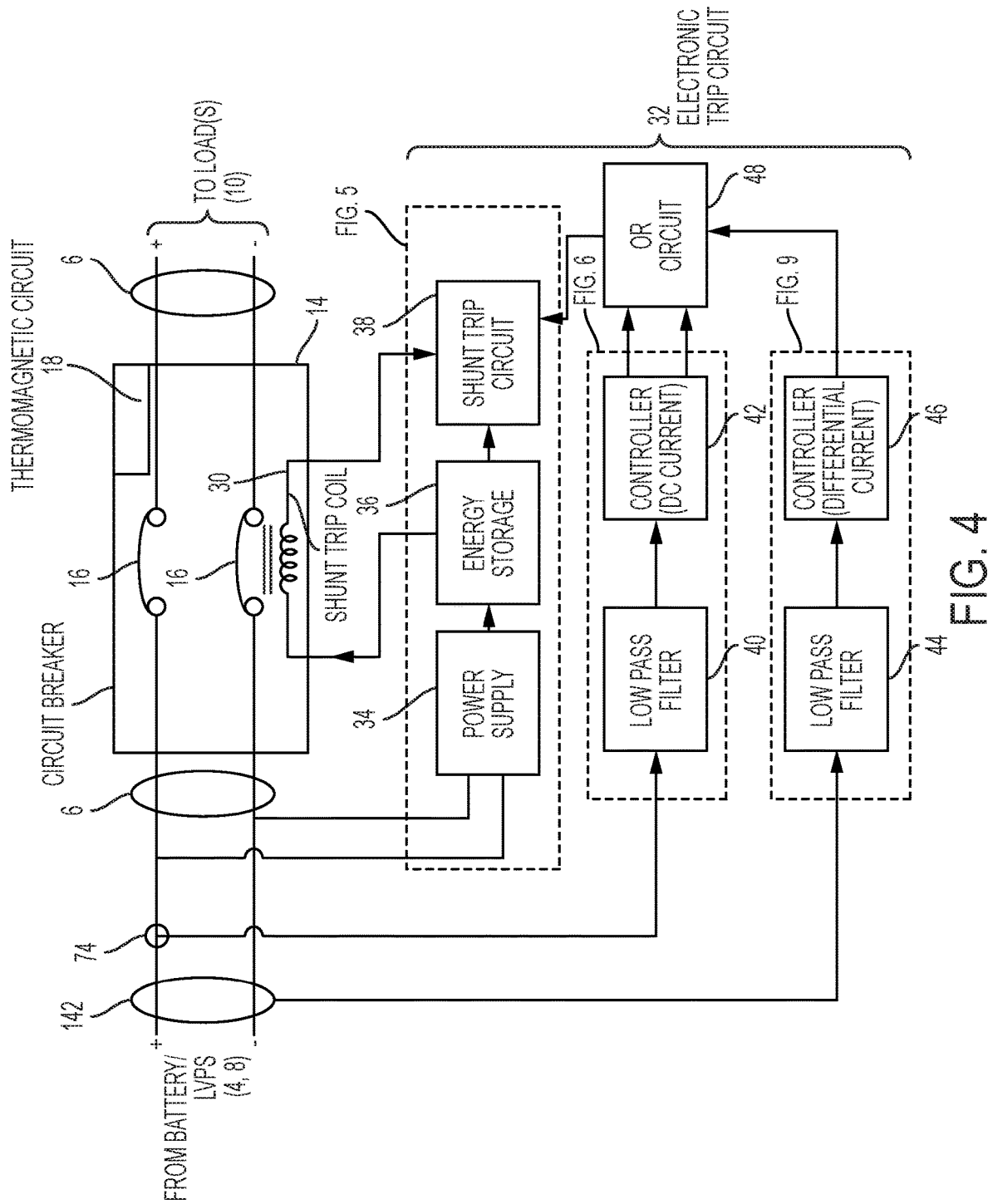
FIG. 4 is a schematic drawing of the circuit breaker and thermomagnetic trip circuit of FIG. 2 including a shunt trip coil that is controlled by an example electronic trip circuit that receives an indication of the current flowing in one or more contacts of the circuit breaker via a current sensor and, optionally, if provided, a differential current sensor.

With reference to FIG. 4, in an example, circuit breaker 14 can be modified to include a shunt trip coil 30 that is operative separately from thermomagnetic trip circuit 18 to cause the contact(s) 16 to move from a closed state to an open state under the control of an electronic trip circuit 32.

Figure 5:
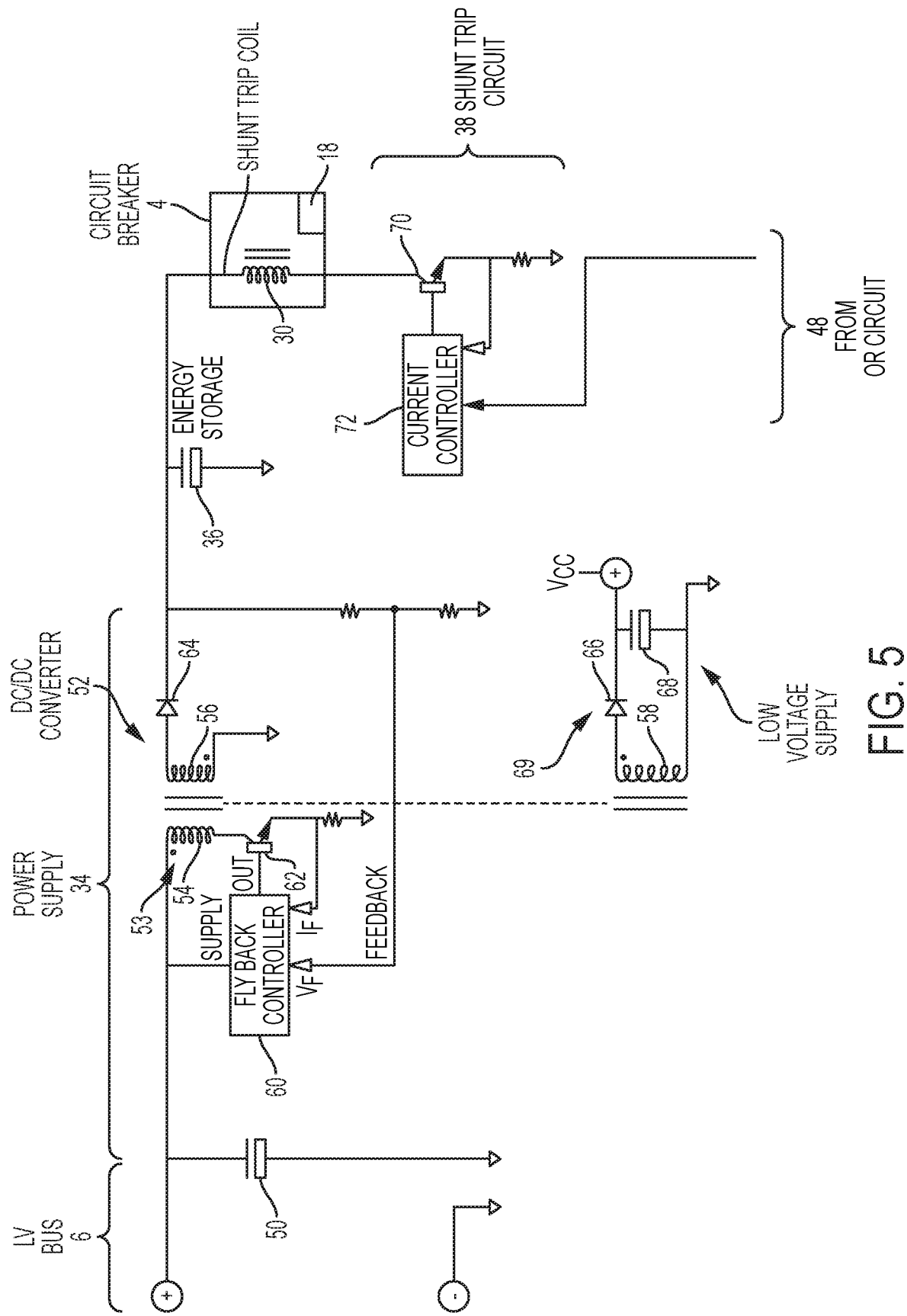
FIG. 5 is a detailed schematic of the power supply, energy storage, circuit breaker (including shunt trip coil), and shunt trip circuit shown in FIG. 4.

In an example, electronic trip circuit 32 includes a power supply 34, an energy storage 36, and a shunt trip circuit 38 shown in more detail in FIG. 5. Electronic trip circuit 32 also includes a low pass filter 40 and a controller 42 shown in more detail in FIG. 6. Finally, electronic trip circuit 32 can optionally include a second low pass filter 44 and a second controller 46 shown in more detail in FIG. 9.

With reference to FIG. 5 and with continuing reference to FIG. 4, power supply 34 includes an input capacitor 50 is connected to the positive and negative lines of low voltage bus 6. Power supply 34 includes a DC/DC converter 52 coupled to receive DC electrical power from low voltage bus 6 and input capacitor 50. In an example, DC/DC converter 52 is operative in a manner known in the art to convert DC voltage on low voltage bus 6 into a voltage suitable for use by shunt trip coil 30 to release the contact(s) 16 from a closed state to an open state and for supplying DC electrical power at a suitable level for the operation of other elements of electronic trip circuit 32. In an example, the DC/DC converter 52 shown in FIG. 5 includes a transformer 53 that includes a primary winding 54, a first, secondary-winding 56, and a second, secondary-winding 58.

The example DC/DC converter 52 shown in FIG. 5 is a flyback converter that includes a flyback controller 60 and a switching element 62 (e.g., a transistor) which are operative for converting the DC input voltage from low voltage bus 6 and input capacitor 50 into an AC voltage which is converted by transformer 53 into first and second AC voltages on first and second secondary-windings 56 and 58 in a manner known in the art. The AC voltage produced on first secondary-winding 56 is rectified by diode 64 and stored in energy storage 36. The AC voltage output by second, secondary-winding 58 is rectified by a diode 66 and stored on a capacitor 68 for use by the one or more elements of electronic trip circuit 32 described hereinafter. The combination of second, secondary-winding 58, diode 66, and a capacitor 68 define a low voltage power supply 69.

Energy storage 36 is connected to one end of shunt trip coil 30 the other end of which is connected to shunt trip circuit 38. In an example, shunt trip circuit 38 includes a switching element 70, e.g., a transistor, coupled to control the flow of current through shunt trip coil 30 under the control of a current controller 72 in response to an output of an OR circuit 48 (FIG. 4). In an example, current controller 72 can include any suitable and/or desirable circuitry that may be required to convert the output of OR circuit 48 into a suitable control signal for controlling the on/off state of switching element 70. It is also envisioned that the output of OR circuit 48 can be used to directly control the on/off state of switching element 70.

The example DC/DC converter 52 shown in FIG. 5 is a flyback converter. However, this is not to be construed in a limiting sense since it is envisioned that any suitable and/or desirable topology or type of DC/DC converter 52 can be utilized. One example of another suitable DC/DC converter is a buck/boost converter. One skilled in the art can select a suitable DC/DC converter for use as the power supply 34 of electronic trip circuit 32. Accordingly, the disclosure herein of power supply 34, including DC/DC converter 52, is not to be construed in a limiting sense.

Figure 6:
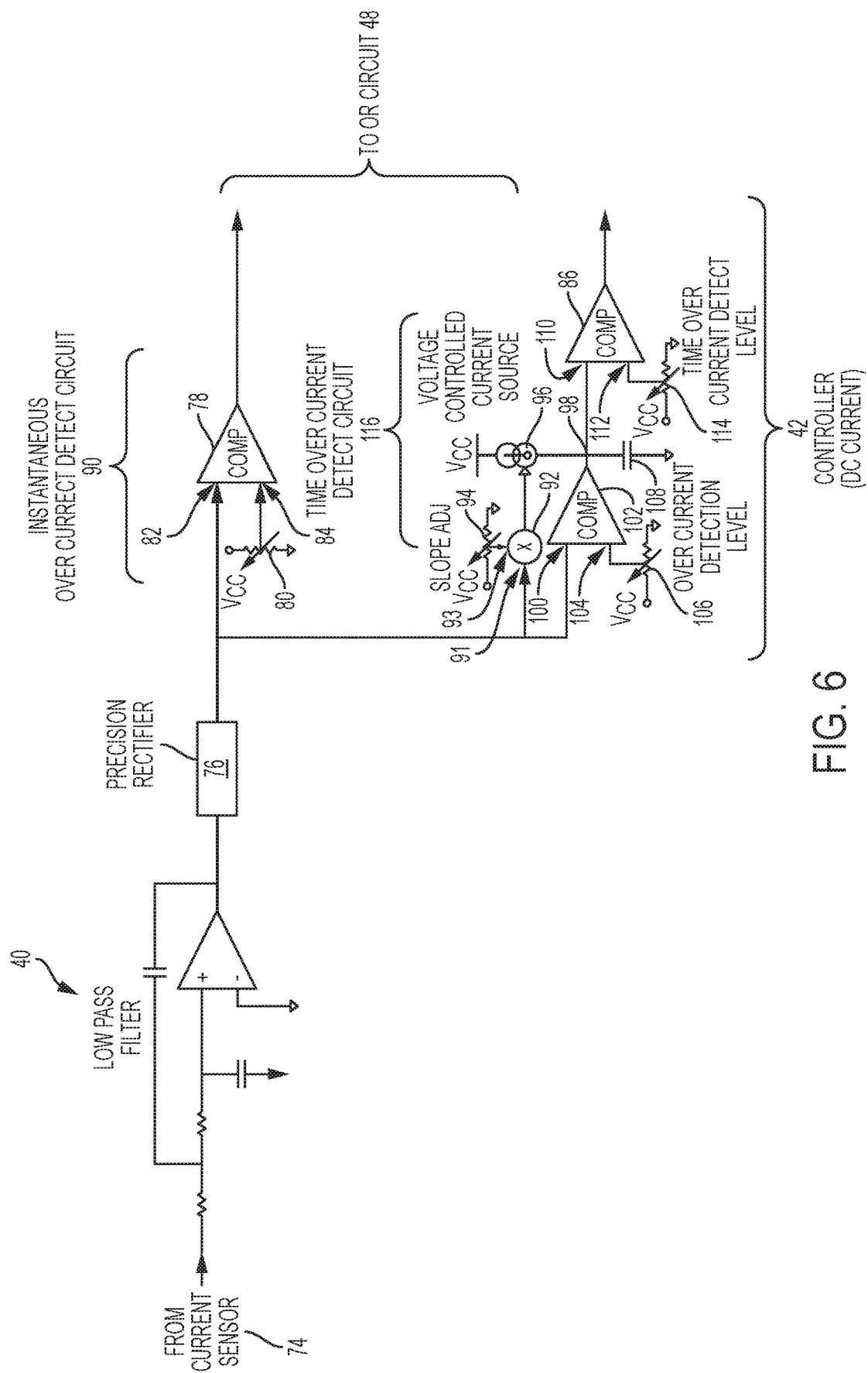
FIG. 6 is a detailed schematic of the low pass filter (40) and controller (DC current) configured for processing the output of the current sensor shown in FIG. 4.

With reference to FIG. 6 and with continuing reference to FIGS. 4 and 5, a current sensor 74, for example, a hall effect sensor, can be positioned to sense current flowing on the positive line of low voltage bus 6. An output of current sensor 74 can be coupled to low pass filter 40 which, in a manner known in the art, low pass filters the output of current sensor 74 and provides the low pass filtered output to a controller (DC current) 42 via an optional precision rectifier 76, if provided.

Controller 42 includes a comparator 78 which compares the output voltage of low pass filter 40 or, if provided, precision rectifier 76 to a reference value set by a resistor 80 which is coupled between the Vcc output of the low voltage power supply 69 and ground. More specifically, comparator 78 operates in a manner known in the art comparing the voltage at a first input 82 output by low pass filter or, if provided, precision rectifier 76 to a second voltage at a second input 84 of comparator 78 provided via resistor 80.

For the purpose of describing logic levels herein, a positive logic convention will be assumed wherein a high, positive, or logical 1 state will be an asserted state (e.g., +5 volts) while a low, negative, ground, or logical 0 state will be considered a deasserted state (e.g., 0 volts or ground).

In a manner known in the art, the output of comparator 78 will be a logical 0 (e.g., ground) when the voltage at first input 82 is lower than the voltage at second input 84. In contrast, the output of comparator 78 will be a logical 1 (e.g., +5 volts) when the voltage at first input 82 is greater than the voltage at second input 84.

As can be appreciated, the voltage at first input 82 of comparator 78 is related, via low pass filter 40 or, if provided, precision rectifier 76, to the current flowing in the positive line of low voltage bus 6 and, hence, the contact(s) 16 of circuit breaker 14. By proper selection of the value of resistor 80, the voltage at second input 84 of comparator 78 can be set, whereupon when the current flowing in the positive line of low voltage bus 6 and, hence, the contact(s) 16 exceeds a predetermined current value, the voltage at first input 82 will exceed the voltage at second input 84 thereby causing the output of comparator 78 to switch from logical 0 to logical 1. In contrast, when the current flowing in the positive line of low voltage bus 6 is less than the predetermined current value, the voltage at first input 82 of comparator 78 will be less than the voltage at second input 84 and the output of comparator 78 will be logical 0. Hence, the combination of comparator 78 and resistor 80 operate as an instantaneous over-current detect circuit 90.

OR circuit 48 (FIG. 4) is coupled to receive the output of comparator 78, comparator 86 (FIG. 6), and comparator 88 (FIG. 9) and to logically OR these outputs in a manner known in the art to produce a single output to control the operation of shunt trip circuit 38. More specifically, in response to OR circuit 48 outputting a logical 1, current controller 72 causes switching element 70 of shunt trip circuit 38 to switch from non-conducting to conducting whereupon current flows through shunt trip coil 30 causing the contact(s) 16 of circuit breaker 14 to move from a closed state to an open state thereby terminating the current that flows through circuit breaker 14.

The output of low pass filter 40 or, if provided, precision rectifier 76 is also provided to a first input 91 of a multiplier 92 which has a second input 93 connected to a variable resistor 94 which sets the voltage level at second input 93 to a desired level. Variable resistor 94 is coupled between the Vcc output of low voltage power supply 69 and ground. In a manner known in the art, multiplier 92 combines (multiplies) the voltages at the first and second inputs 91 and 93 and outputs the multiplied signal to a control input of a voltage controlled current source 96 having an output coupled to a node 98. The value of current output by voltage controlled current source 96 is related in a manner known in the art to the voltage output by multiplier 92.

The output of low pass filter 40 or, if provided, precision rectifier 76, is also provided to a first input 100 of a comparator 102 which has a second input 104 coupled to a variable resistor 106 which sets the voltage level at second input 104 to a desired level. Variable resistor 106 is coupled between the Vcc of low voltage power supply 69 and ground. When the voltage at first input 100 is less than the voltage at second input 104, the output of comparator 102 coupled to node 98 is logical 0 (e.g., ground). In contrast when the voltage at first input 100 is greater than the voltage at second input 104, the output of comparator is logical 1 (e.g., +5 volts). In use, the output of comparator 102 at logical 0 corresponds to the output of comparator 102 being at a ground level. Hence, when the output of comparator 102 is at ground level, current output by current source 96 to node 98 will flow to ground via the output of comparator 102 in a manner known in the art. In contrast, when the output of comparator 102 is logical 1 (e.g., +5 volts), the current output by current source 96 to node 98 will flow into a timing capacitor 108 which charges linearly over time in response to being fed with the current output by voltage controlled current source 96. Hence, by the selection of the value of resistor 106, the current level flowing through the positive line of low voltage bus 6 corresponding to where the output of comparator 102 switches from logical 0 to logical 1 can be set.

A comparator 86 has a first input 110 coupled to node 98 and a second input 112 coupled to a variable resistor 114, the value of which can be selected so that the voltage at second input 112 can be set to a predetermined value where it is desired that comparator 86 switches from logical 0 to logical 1 in response to the voltage at first input 110 exceeding the voltage at the second input 112. Variable resistor 114 is coupled between the Vcc output of low voltage power supply 69 and ground.

Multiplier 92, voltage control current source 96, resistor 94, comparator 102, resistor 106, timing capacitor 108, comparator 86, and resistor 114 define a time over current detect circuit 116, the operation of which will now be described with reference to the log-log graph of current versus time of FIG. 7.

Figure 7:
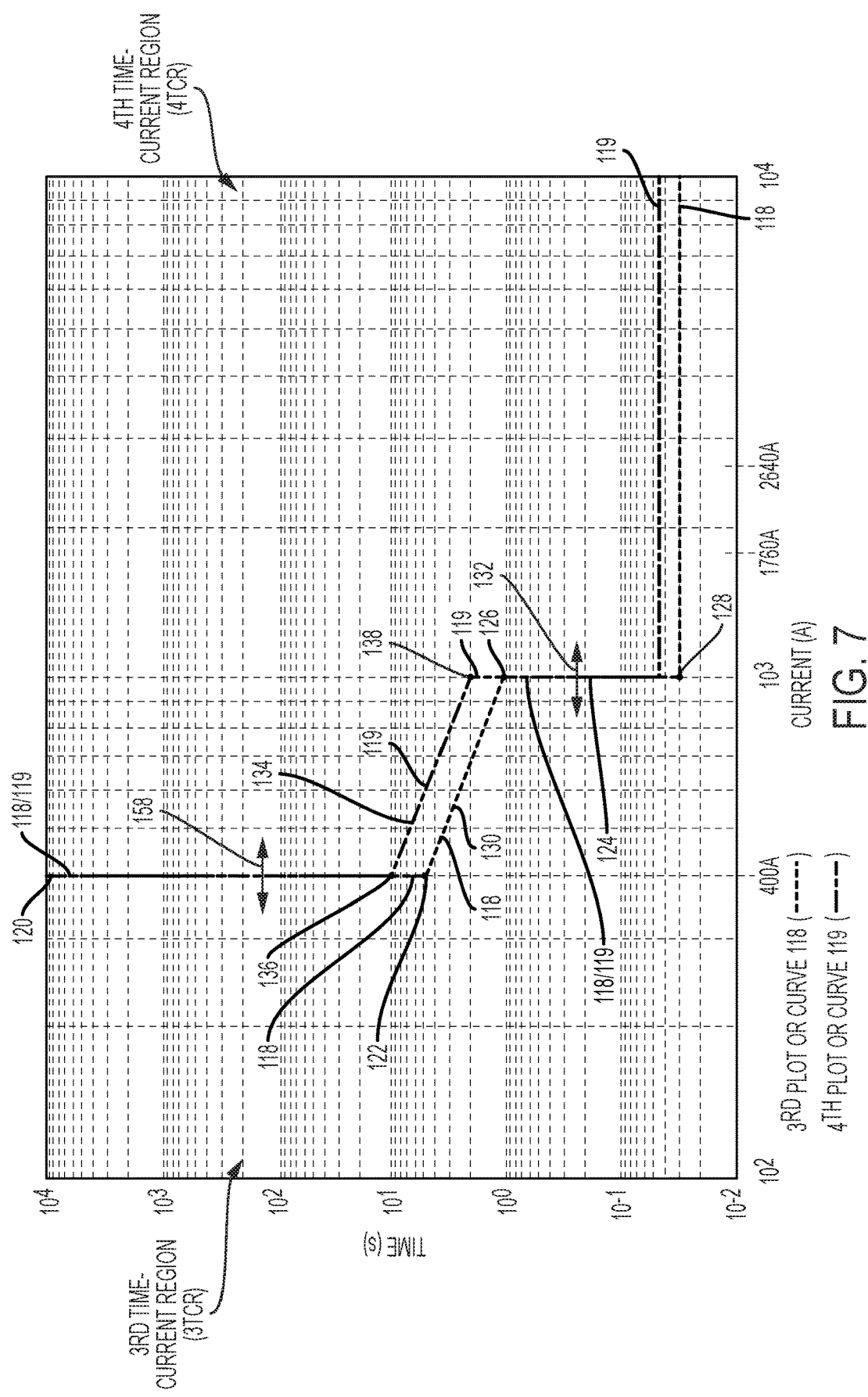
FIG. 7 is a log-log graph of current versus time including example third and fourth plots illustrating the operation of the controller (DC current) of FIG. 6 to control the closed and open state of one or more of the contacts of the circuit breaker of FIG. 4 in accordance with either the third plot or the fourth plot based on adjustments of resistors of the controller (DC current) shown in FIG. 6.

FIG. 7 includes a third plot 118 of current versus time that can be realized by time over current detect circuit 116. Fourth plot 119 is a variation of third plot 118 which will be described hereinafter.

Third plot 118 includes a left vertical line portion 120 which has one end at point 122 (400 amps, 4.5 seconds) and extends vertically upward in the time direction, to the top of the graph, on the 400 amp line for times in excess of 4.5 seconds, e.g., time>1,000 seconds.

Third plot 118 also includes a right vertical line portion 124 having one end at point 126 (1,000 amps, 1 second) and which extends vertically downward in the time direction on the 1,000 amp line to a point 128 (1,000 amps, 0.03 seconds). Third plot 118 also includes a sloped line 130 that joins points 122 of left vertical line portion 120 and point 126 of right vertical line portion 124.

With ongoing reference to FIG. 7 and referring back to FIG. 6, the current versus time points to the right of vertical line portion 124 are set by instantaneous over current detect circuit 90 and, more particularly, by adjusting the value of resistor 80 and, hence, the voltage at second input 84 of comparator 78. For example, reducing the voltage at second input 84 reduces the value of current running through the contact(s) 16 of circuit breaker 14 that cause the output of comparator 78 to switch from logical 0 to logical 1. Conversely, increasing the voltage at second input 84 increases the value of current running through the contact(s) 16 that cause comparator 78 to switch from logical 0 to logical 1. Hence, by controlling the voltage at second input 84 of comparator 78, the level of current that flows through the contact(s) 16, and hence, the horizontal position of right vertical line portion 124 in FIG. 7 that causes shunt trip coil 30 to open the contact(s) 16 can be adjusted. In FIG. 7, this adjustment is represented by two-headed arrow 132.

In an example, assume that the value of resistor 80 is set whereupon the output of comparator 78 changes from logical 0 to logical 1 when the current flowing through the contact(s) 16 exceeds 1,000 amps (as represented by right vertical line portion 124). In response, OR circuit 48 outputs a signal that causes shunt trip circuit 38 to switch to a state whereupon current flows through shunt trip coil 30 causing the contact(s) 16 to release from a closed state to an open state thereby terminating the flow of current through DC circuit breaker 14. By reducing or increasing the voltage at second input 84 by adjusting resistor 80, the position of right vertical line 124, and, hence the value of current that causes the output to change from logical 0 to logical 1, can be shifted to the left or the right, as shown by two-headed arrow 132.

In an example, in response to the current flowing through the contact(s) 16 falling below 1,000 amps, the output of comparator 78 changes back from the logical 1 to a logical 0. The example of 1,000 amps as the value of current that causes the output of comparator 78 to change from logical 0 to logical 1, or vice versa, is for illustration purposes only and is not to be construed in a limiting sense.

Referring now to left vertical line portion 120, the operation of time over current detect circuit 116 will now be described.

The voltage at second input 104 of comparator 102 sets the level of current that will cause timing capacitor 108 to be charged with current from voltage controlled current source 96 and, hence, the operation of comparator 86. Specifically, if the voltage at first input 100 of comparator 102 is less than the voltage at second input 104, the output of comparator 102 will be logical 0 (e.g., ground), whereupon current output by voltage controlled current source 96 will flow into the grounded output of comparator 102 via node 98. It is to be appreciated that the voltage at first input 100 is related to the current flowing in the contact(s) 16 and the voltage at second input 104 corresponds to a predetermined current flowing in the contact(s) 16 above which control is desired.

In an example, assume that the value of the voltage at second input 104 is set to correspond to a current of 400 amps, e.g., as illustrated by left vertical line portion 120 in FIG. 7. When, current flowing in the positive line of low voltage bus 6 is less than 400 amps, the voltage at first input 100 of comparator 102 will be less than the voltage at second input 104 whereupon the output of comparator 102 will be logical 0 (e.g., ground), whereupon current output by voltage controlled source 96 will flow to ground via the output of comparator 102. In contrast, in response to the current flowing in the positive line of low voltage bus 6 being ≥400 amps, the voltage at first input 100 of comparator 102 will exceed the voltage at second input 104 whereupon, the output of comparator 102 will be logical 1 (e.g., 5 volts), whereupon current from voltage controlled current source 96 will flow into timing capacitor 108 charging it linearly over time.

As the voltage on timing capacitor 108 increases in response to being charged by current from voltage controlled current source 96, the voltage at first input 110 of comparator 86 increases over time from a voltage below the voltage at second input 112 (where the output of comparator 86 is a logical 0) to a voltage greater than the voltage at second input 112 (where the output of comparator 86 is a logical 1). In response to the voltage at first input 110 becoming greater than the voltage at second input 112, the output of comparator 86 switches from logical 0 to logical 1. In response, OR circuit 48 outputs a signal that causes shunt trip circuit 38 to switch to a state whereupon current flows through shunt trip coil 30 causing the contact(s) 16 to release from a closed state to an open state thereby terminating the flow of current through DC circuit breaker 14.

In response to terminating the flow of current through the contact(s) 16 of DC circuit breaker 14, the voltage at first input 100 of comparator 102 drops below the value of the voltage at second input 104 thereby causing comparator 102 to switch from logical 1 back to logical 0 whereupon current from voltage control current source 96 once again flows to ground via the output of comparator 102 and the charge stored in timing capacitor 108 discharges through the grounded output of comparator 102. In response to the discharge of timing capacitor 108 in this manner, the output of comparator 86 switches from logical 1 back to logical 0.

Hence, in response to opening the contact(s) 16 of DC circuit breaker 14, the states of instantaneous over current detect circuit 90 and time over current detect circuit 116 can return to starting conditions, e.g., logical 0 outputs to OR circuit 48.

If desired, current controller 72 can include a latch circuit (not shown) that causes shunt trip circuit 38 to remain in a state with current flowing through shunt trip coil 30, thereby maintaining the contact(s) 16 in an open state until the latch circuit is reset by an external input. Latching the contact(s) 16 in an open state in this manner avoids automated closing of the contact(s) 16 when a fault condition (short) may still exist on the lines of low voltage bus 6. If desired, this external reset can be a manual reset or can be a time-based reset via external circuitry (not shown) which attempts to reset the contact(s) 16 to a closed state after some period of time.

An example of the operation of time over current detect circuit 116 will now be described with reference to sloped line 130 in FIG. 7. Assume a current of 500 amps flows in the positive line of low voltage bus 6 and is sensed by current sensor 74. In response, a voltage corresponding to 500 amps is presented to input 91 of multiplier 92 and to first input 100 of comparator 102. Assume further that the voltage at first input 100 of comparator 102 is greater than the voltage at second input 104, the latter of which is set to a voltage corresponding to, for example, 400 amps current flowing through the positive line of low voltage bus 6. Under these conditions, the output of comparator 102 will be logical 1.

In response to the voltage at input 91 of multiplier 92 corresponding to a current of 500 amps flowing into positive line of low voltage bus 6, multiplier 92 outputs to voltage controlled current source 96 a voltage corresponding to the product of said voltage at input 91 of multiplier 92 and a voltage applied to input 93 of multiplier 92 via resistor 94. The voltage supplied to the input of voltage controlled current source 96, which voltage varies based on the current flowing in the positive line of low voltage bus 6, causes voltage controlled current source 96 to output a current corresponding to 500 amps in the positive line of low voltage bus 6 to node 98. Because, in this example, of the output of comparator 102 is logical 1, the current output by voltage controlled current source 96 flows into and charges timing capacitor 108 linearly. As shown in FIG. 7 for the vertical line corresponding to 500 amps (the vertical line immediately to the right of the 400 amp vertical line) timing capacitor 108 accumulates charge for 3.5 seconds, at which time the voltage on capacitor 108 appearing at first input 110 of comparator 86 exceeds the voltage at second input 112 of comparator 86, whereupon the output of comparator 86 switches from logical 0 to logical 1. In response to the output of comparator 86 switching to logical 1, switching element 70 of shunt trip circuit 38 is caused to switch from an open state to a closed (conducting) state via OR circuit 48. In response to switching element 70 switching to a conducting state, current flows through shunt trip coil 30 causing the contact(s) 16 of DC circuit breaker 14 to switch from a closed state to an open state, thereby terminating the flow of electrical current through circuit breaker 14.

Hence, as can be understood from the 500 amp vertical line in FIG. 7, the contact(s) 16 switch from a closed state to an open state after 3.5 seconds of 500 amps flowing through the positive line of low voltage bus 6.

In another example with reference to FIG. 7, in response to 900 amps flowing in the positive line of low voltage bus 6, time over current detect circuit 116 operating in the manner discussed above for 500 amps, will cause the contact(s) 16 to switch from a closed state to an open state after 1.1 seconds.

The difference in time before contacts 16 switch from closed state to an open state in response to 500 amps flowing or 900 amps flowing in the positive line of low voltage bus 6 is a result of the operation of the control voltage output by multiplier 92 being less when 500 amps flow in the positive line of low voltage bus 6 and more when 900 amps flow in the positive line of low voltage bus 6. More specifically, the current output by voltage controlled current source 96 will be less when 500 amps flow in the positive line of low voltage bus 6 and will be more when 900 amps flow thereby changing the amount of time that timing capacitor 108 charges before the voltage at first input 110 of comparator 86 is greater than the voltage at second input 112. Hence, as can be understood by sloped line 130, time over current detect circuit 116 responds more quickly to a higher current flowing in the positive line of low voltage bus 6 and responds slower to a lower current flowing in the positive line of low voltage bus 6. Of course, as discussed above, the current corresponding to right vertical line 124 is set by instantaneous over current detect circuit 90 while the current associated with left vertical line 120 is set by comparator 102 of time over current detect circuit 116.

As can be appreciated, third plot 118 in FIG. 7 represents an example response of controller 42 comprising instantaneous over current detect circuit 90 and time over current detect circuit 116 shown in FIG. 6. By adjusting resistor 80 of instantaneous over current detect circuit 90, the horizontal position of right vertical line 124 can be adjusted to the left or to the right, as shown by two-headed arrow 132 in FIG. 7. Similarly, adjusting the value of resistor 106 of comparator 102 of time over current detect circuit 116 can adjust the horizontal position of left vertical line 120, as shown by two-headed arrow 158 in FIG. 7.

Still further, the slope of sloped line 130 can be adjusted by adjusting the value of resistor 94 which controls the voltage supplied to the second input of multiplier 92. By adjusting this voltage, the voltage output by multiplier 92 to the input of voltage control current source 96 can control the slope of sloped line 130.

Finally, the vertical position of sloped line 130 can be adjusted vertically up and down in FIG. 7, thereby adjusting the time that timing capacitor 108 must charge for a given current flowing in the positive line of low voltage bus 6 before the contact(s) 116 are switched from a closed state to the open state. In an example, assume it is desired to increase the time that a current flowing between 400 amps and 1,000 amps flows in the positive line of low voltage bus 6 before the contact(s) 16 are switched from the closed state to the open state. To accomplish this, the voltage at second input 112 of comparator 86 is increased by adjusting the value of resistor 114. In response to increasing the voltage at second input 112 of comparator 86, timing capacitor 108 must accumulate charge for a longer period of time before the voltage at first input 110 of comparator 86 exceeds the voltage at second input 112. Hence, in this example, for a current flowing in the positive line of low voltage bus 6 between 400 amps and 1,000 amps, increasing the voltage at second input 112 of comparator 86 increases the time that said current flows before the contact(s) 16 are switched from a closed state to an open state. This is illustrated by the shifted position of sloped line 130 to the position of sloped line 134 in FIG. 7. Similarly, reducing the voltage at second input 112 reduces the amount of time that current between 400 amps and 1,000 amps flows in the positive line of low voltage bus 6 before the contact(s) 16 are caused to switch from a closed state to an open state.

In the example discussed above for increasing the time that a current between 400 amps and 1,000 amps flows in the positive line of low voltage bus 6 before the contact(s) 16 are caused to switch from a closed state to an open state, for a current of 1,000 amps, this results in sloped line 134 crossing the 1,000 amp vertical line at point 138 (1,000 amps, 2 seconds) versus point 126 (1,000 amps, 1 second for sloped line 130). Below point 126, right vertical line 124 is common to third plot 118 and fourth plot 119. In another example, for a current of 400 amps flowing in positive line of low voltage bus 6, increasing the time that 400 amps flows results in sloped line 134 crossing the 400 amp vertical line at point 136 (400 amps, 10 seconds), versus point 122 (400 amps, 4.5 seconds) for sloped line 130. It is to be appreciated that third plot 118 and fourth plot 119 in FIG. 7 are simply different responses of controller 42 due to adjustments of one or more of resistors 80, 94, 106, and 114.

As can be understood from FIG. 7, when a current above 1,000 amps flows in the positive line of low voltage bus 6, instantaneous over current detect circuit 90 will cause the contact(s) 16 to switch from a closed state to an open state after a brief delay due to signal propagation delays through low pass filter 40, instantaneous over current detect circuit 90, OR circuit 48, and shunt trip circuit 38. In an example shown in FIG. 7, this delay is between 0.03 and 0.045 seconds. However, this is not to be construed in a limiting sense.

Because the vertical differences of sloped lines 130 and 134 in FIG. 7 simply represent the response of controller 42 to different values of resistor 114 supplying the voltage to the second input 112 of comparator 86, for the purpose of discussion hereinafter, reference will be made exclusively to third plot 118 including sloped line 130. However, this is not to be construed in a limiting sense since one skilled in the art would understand that the following discussion can equally apply to fourth plot 119 including sloped line 134.

In FIG. 7, the area of the time-current region to the left of third plot 118 represents a third time-current region (3TCR) where the contact(s) 16, starting in a closed state, remain in the closed state in response to the one or more contacts being exposed to a combination of current and time in 3TCR. The area of the time-current region to the right of third plot 118 represents a fourth time-current region (4TCR) where the contact(s) 16, starting in the closed state, switch to the open state in response to the contact(s) 16 being exposed to a combination of current and time in the 4TCR. For the purpose of discussion, the current versus time points represented by third plot 118 can be considered to reside in 4TCR.

Figure 8:
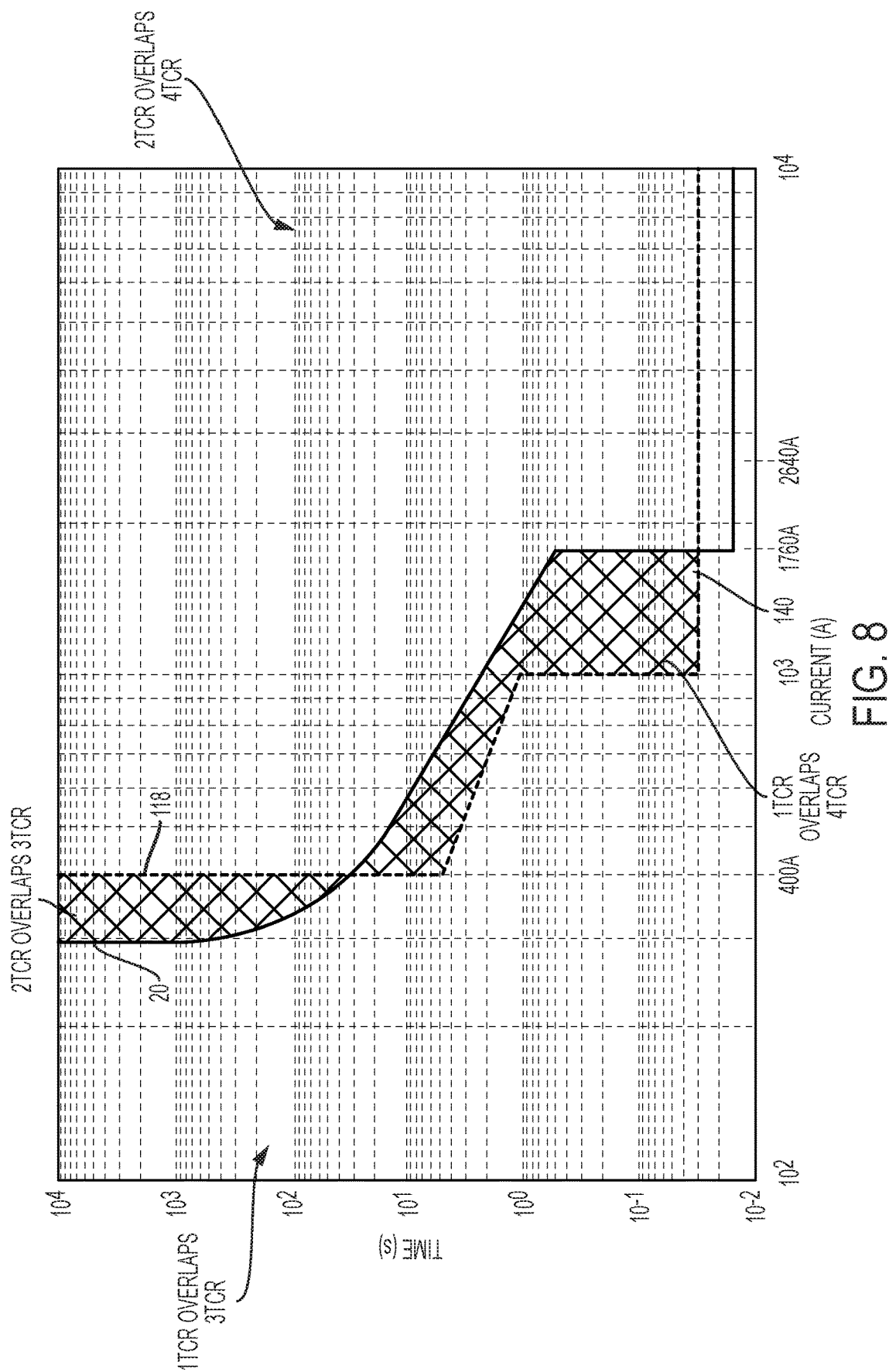
FIG. 8 is a log-log graph of current versus time including the first plot of FIG. 3 and the third plot of FIG. 7 reproduced thereon.

With reference to FIG. 8, wherein the first plot 20 in FIG. 3 and the third plot 118 in FIG. 7 are drawn on the same log-log graph of current versus time, assume that the thermomagnetic trip circuit 18 of circuit breaker 14 shown in FIG. 4 operates in accordance with the thermomagnetic trip (minimum tolerance) represented by first plot 20 and that controller 42 is set to operate in accordance with third plot 118. As can be understood from FIG. 8, large parts of 1TCR and 3TCR overlap as well as large parts of 2TCR and 4TCR overlapping.

However, as can be understood from FIG. 8, a part of 1TCR to the left of first plot 20 and a part of 4TCR to the right of third plot 118 overlap in the area of current versus time shown by area 140. It is in this area 140 that the electronic trip circuit 32 and, more particularly, controller 42 improves the switching performance of the contact(s) 16 to reliably switch from a closed state to an open state in a time-dependent manner over the switching performance of thermomagnetic trip circuit 18 represented by first plot 20. In an example with reference to FIG. 8, when 500 amps flows through the positive line of low voltage bus 6, the electronic trip circuit 32 and, more particularly, controller 42 will cause the contact(s) 16 to switch from a closed state to the open state after 3.5 seconds versus about 16 seconds for thermomagnetic trip circuit 18.

In another example, at or above 1,000 amps flowing in the positive line of low voltage bus 6, electronic trip circuit 32 and, more particularly, controller 42 will cause the contact(s) 16 to switch from the closed state to an open state after a signal propagation delay through the circuitry of electronic trip circuit 32. In contrast, between 1,000 amps and 1,760 amps, thermomagnetic trip circuit 18 would allow current to flow in the positive line of low voltage bus 6 for between 0.5 seconds at 1,760 amps and about 2 seconds at 1,000 amps.

Hence, as can be seen, the combination of electronic trip circuit 32 and shunt trip coil 30 can improve the switching performance of the contact(s) 16 over the trip performance of thermomagnetic trip circuit 18 alone. With that said, as shown by first plot 20 in FIG. 8, the open and closed state of the contact(s) 16 below 400 amps flowing in the positive line of low voltage bus 6 is controlled by thermomagnetic trip circuit 18 in a manner known in the art.

Figure 9:
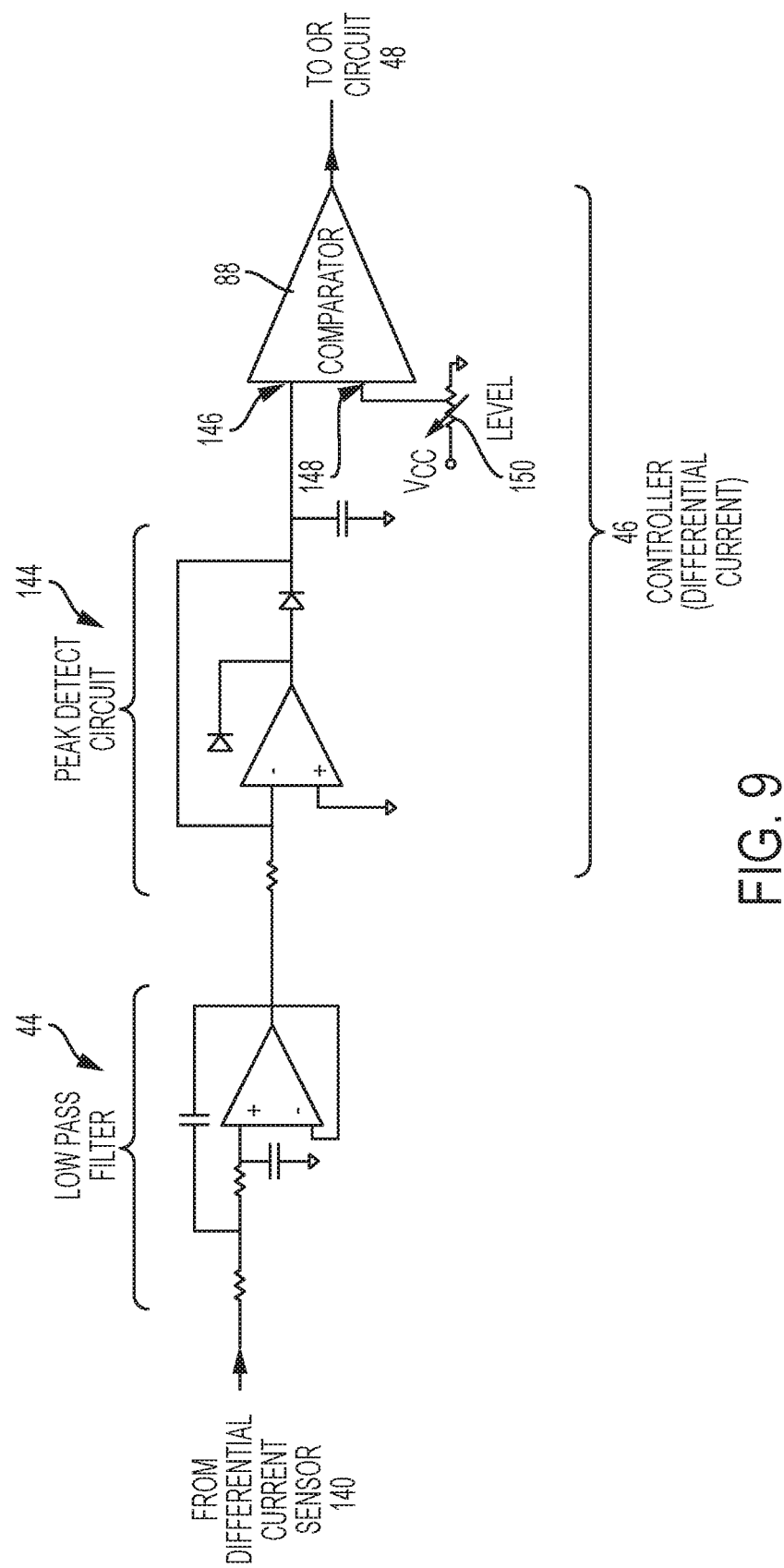
FIG. 9 is a detailed schematic of the optional low pass filter and the optional controller (differential current) of FIG. 4 configured to process the output of the differential current sensor.

With reference to FIG. 9 and with reference back to FIG. 4, an optional differential current sensor 142 can measure the difference between the current flowing in the positive and negative lines of low voltage bus 6 and can produce an output related to said difference to an optional controller (differential current) 46 via an optional low pass filter 44. As shown in FIG. 9, controller 46 includes a peak detect circuit 144 which has an output connected to a first input 146 of comparator 88 which has a second input connected to a variable resistor 150 biased by Vcc and ground. The difference in current sensed by differential current sensor 142 is low pass filtered by low pass filter 44 and detected by peak detect circuit 144 which outputs a corresponding signal to first input 146 of comparator 88. In response to the voltage at first input 146 exceeding the voltage at second input 148, the output of comparator 88 switches from logical 0 to logical 1. In response to the output of comparator 88 switching to logical 1, switching element 70 of shunt trip circuit 38 is caused to switch from a non-conducting state to a conducting state whereupon current flows in shunt trip coil 30 causing the contact(s) 16 to switch from a closed state to an open state. Hence, as can be understood, when the voltage at first input 146 (corresponding to the difference in current sensed by differential current sensor 142) exceeds the voltage at second input 148 of comparator 88, the contact(s) 16 can be switched from a closed state to an open state.

It is to be appreciated that power supply 34 and energy storage 36 can be operative for supplying power to shunt trip coil 30 and to the electronic components of low pass filter 40, controller 42, OR circuit 48, shunt trip circuit 38, and, optionally, if provided, low pass filter 44 and controller 46, during varying voltage conditions on low voltage bus 6. For example, when the positive and negative lines of low voltage bus 6 are shorted together, the voltage supplied to power supply 34 by low voltage bus 6 can be at or close to 0 volts. Under this circumstance, energy storage 36 can be configured to supply electrical power to the various electronic components for as long as it is deemed suitable and/or desirable by the appropriate selection of the size and storage capacity of energy storage 36, which can be a capacitor or a rechargeable battery.

Figure 10:
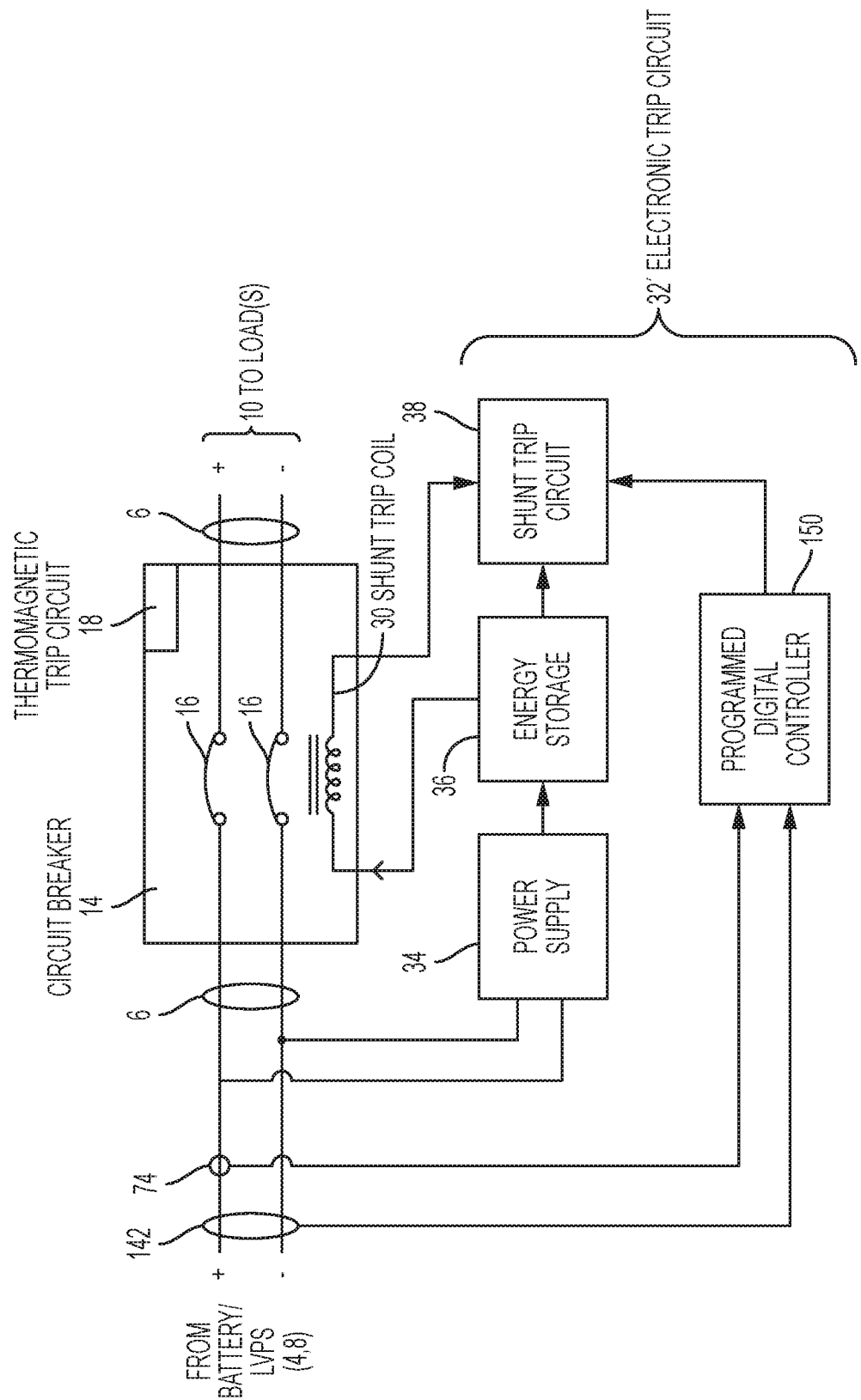
FIG. 10 is a schematic of the circuit breaker including the thermomagnetic trip circuit and shunt trip coil shown in FIG. 4 and including another example electronic trip circuit that includes a programmed digital controller to digitally process the output of the current sensor and, optionally, if provided, the differential current sensor.

With reference to FIG. 10, another example electronic trip circuit 32' can be similar in many respects to the electronic trip circuit 32 discussed above with the following exceptions. The functions performed by low pass filter 40, controller 42, and OR circuit 48 can be performed by a programmed digital controller 150. The functions performed by optional low pass filter 44 and optional controller 46, if desired, can also be performed by programmed digital controller 150.

Figure 11:
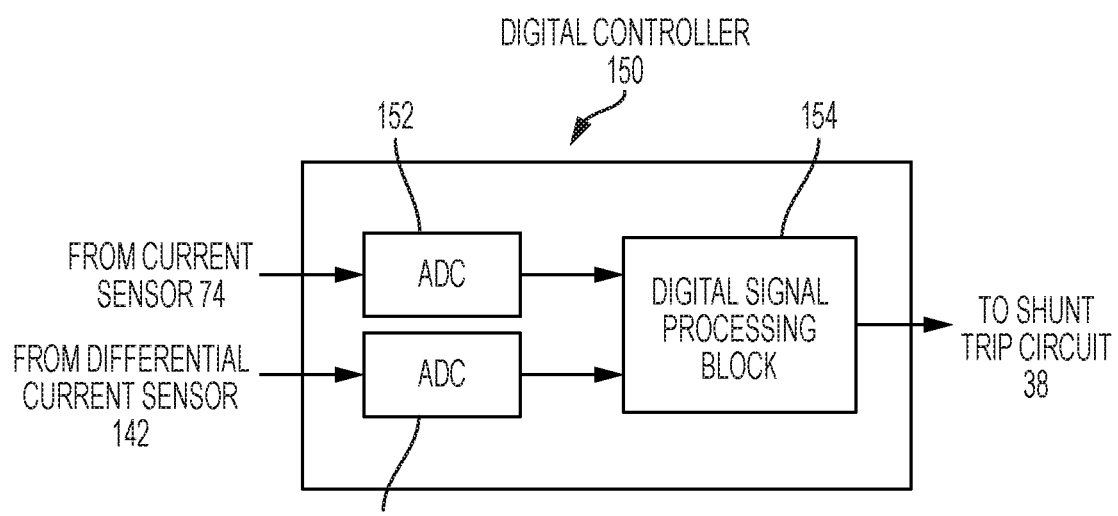
FIG. 11 is an example block diagram of the programmed digital controller shown in FIG. 10.

With reference to FIG. 11 and with continuing reference to FIG. 10, in this example, the output of current sensor 74 is supplied to an analog digital converter (ADC) 152 which converts the analog output of current sensor 74 into a digital equivalent which is supplied to a digital signal processing block 154. In an example, digital signal processing block 154 can be a microprocessor or a digital signal processor (DSP) operating under the control of computer readable program code. Operating under the control of the computer readable program code, digital signal processing block 154 can emulate some or all of the functions performed by low pass filter 40, controller 42, and OR circuit 48 discussed above. For example, in a simplified embodiment, the computer readable program code can cause digital signal processing block 154 to control the open state of the contact(s) 16 in accordance with the third plot 118 shown in FIG. 7. In other words, digital signal processing block 154 operating in accordance with computer readable program code can cause the contact(s) 16 to switch from a closed state to an open state when the combination of current and time measured by digital signal processing block 154 resides in the 4TCR. Similarly, subject to the operation of thermomagnetic trip circuit 18, digital signal processing block 154 operating in accordance with computer readable program code can be operative for maintaining the contact(s) 16 in a closed state for any combination of current and time in the 3TCR.

If desired, digital controller 150 can also include an optional second analog to digital converter (ADC) 156 coupled to the output of differential current sensor 142. In a manner known in the art, ADC 156 can convert the analog output of differential current sensor 142 into a digital equivalent which can be supplied to digital signal processing block 154 for optional processing. If desired, the functions performed by low pass filter 44 and controller 46 can be emulated digitally by digital signal processing block 154 operating under the control of the computer readable program code. In a simple example, if the differential current sensed by differential current sensor 142 exceeds a predetermined value, the computer readable code can cause digital signal processing block 154 to output to shunt trip circuit 38 a signal which causes the contact(s) 16 to switch from a closed state to an open state.

Hence, as can be seen, the functions performed by low pass filter 40, controller 42, OR circuit 48 and, if desired, low pass filter 44 and controller 46 in FIG. 4 can be emulated by the programming of program digital controller 150.

As can be seen, disclosed herein is a DC circuit breaker comprising at least one contact configured to be coupled between a source of DC power and a DC load. The DC circuit breaker includes a thermomagnetic trip circuit operable in accordance with a first time-current curve that defines: a first time-current region (1TCR) where the contact, starting in a closed state, remains in the closed state in response to the contact being exposed to a combination of current and time in the 1TCR, and a second time-current region (2TCR) where the contact, starting in the closed state, switches to an open state in response to the contact being exposed to a combination of current and time in the 2TCR. The DC circuit breaker also includes an electronic trip circuit operable in accordance with a second time-current curve that defines: a third time-current region (3TCR) where the contact, starting in the closed state, remains in the closed state in response to the contact being exposed to a combination of current and time in the 3TCR, and a fourth time-current region (4TCR) where the contact, starting in the closed state, switches to the open state in response to the contact being exposed to a combination of current and time in the 4TCR. Each combination of current and time can comprise a total time that DC current flows in the contact and a level of the DC current flowing in the contact at said total time.

At least a part of the 1TCR and a part of the 4TCR can overlap and have time-current pairs or points in common.

A current sensor can be provided to sense the DC current flowing in the contact. The electronic trip circuit can include a controller responsive to an output of the current sensor for determining that at least one combination of current and time falls in the 4TCR.

The controller can be responsive to determining that said at least one combination of current and time falls in the 4TCR for causing the contact to switch from the closed state to the open state.

The electronic trip circuit can include: a converter configured to convert DC voltage on the DC bus to a different level DC voltage; and an energy storage for storing DC power at the different level DC voltage for use by the controller.

The controller can include a time over current detect circuit which determines, based on the output of the current sensor, that the level of the DC current flowing in the contact exceeds a predetermined level and the total time that must accumulate before the combination of current and time is in the 4TCR.

The controller can also include a level detector (or instantaneous over current detect circuit) configured to detect when the sensed DC current exceeds a predetermined maximum level and, in response thereto, to cause the contact to switch from the closed state to the open state.

Also disclosed is a method of controlling a DC circuit breaker comprising: (a) sensing a level of DC current flowing in at least one contact of the DC circuit breaker in a closed state; (b) accumulating an indication of the total time the DC current in step (a) is sensed; (c) comparing the accumulated indication in step (b) to a predetermined value or level; and (d) in response to the accumulated indication in step (b) exceeding the predetermined value or level, causing the at least one contact to switch from the closed state to an open state.

The accumulated indication can be represented as an accumulated charge on a capacitor.

The capacitor can be charged with current from a current source and the value of the charging current can be based on the level of the DC current sensed in step (a).

Step (b) can include accumulating the indication of the total time the DC current in step (a) is sensed only when the level of the DC current exceeds a predetermined value.

At least one of steps (b), (c), and (d) can be performed under the control of a programmed digital controller. The programmed digital controller can include one of the following operating under the control of computer readable program code: a microprocessor; or a digital signal processor (DSP).

The method can further include (e) causing the at least one contact to switch from the closed state to the open state in response to a temperature of the DC circuit breaker exceeding a predetermined temperature.

The method can further include (e) causing the at least one contact to switch from the closed state to the open state in response to a magnetic field produced by the DC current flowing in at least one contact exceeding a predetermined value.

The foregoing examples have been described with reference to the accompanying figures. Modifications and alterations will occur to others upon reading and understanding the foregoing examples which are provided for the purpose of illustration and are not to be construed in a limiting sense. Accordingly, the foregoing examples are not to be construed as limiting the disclosure.

The invention claimed is:
1. A DC circuit breaker comprising:
   at least one contact configured to be coupled between a source of DC power and a DC load;
   a thermomagnetic trip circuit operable in accordance with a first time-current curve that defines:
      a first time-current region (1TCR) where the contact, starting in a closed state, remains in the closed state in response to the contact being exposed to a combination of current and time in the 1TCR, and
      a second time-current region (2TCR) where the contact, starting in the closed state, switches to an open state in response to the contact being exposed to a combination of current and time in the 2TCR; and an electronic trip circuit operable in accordance with a second time-current curve that defines:
   a third time-current region (3TCR) where the contact, starting in the closed state, remains in the closed state in response to the contact being exposed to a combination of current and time in the 3TCR, and
   a fourth time-current region (4TCR) where the contact, starting in the closed state, switches to the open state in response to the contact being exposed to a combination of current and time in the 4TCR, wherein:
each combination of current and time comprises a total time that DC current flows in the contact and a level of the DC current flowing in the contact at said total time,
at least a part of the 1TCR and a part of the 4TCR overlap and have first time-current pairs or points in common, and
at least a part of the 2TCR and a part of the 3TCR overlap and have second time-current pairs or points in common.

2. The DC circuit breaker of claim 1, further including a current sensor configured to sense the DC current flowing in the contact, wherein the electronic trip circuit includes a controller responsive to an output of the current sensor for determining that at least one combination of current and time falls in the 4TCR.

3. The DC circuit breaker of claim 2, wherein the controller is responsive to determining that said at least one combination of current and time falls in the 4TCR for causing the contact to switch from the closed state to the open state.

4. The DC circuit breaker of claim 2, wherein the electronic trip circuit includes:
   a converter configured to convert DC voltage on the DC bus to a different level DC voltage; and
   an energy storage for storing DC power at the different level DC voltage for use by the controller.

5. The DC circuit breaker of claim 2, wherein the controller includes a time over current detection circuit which determines, based on the output of the current sensor, that the level of the DC current flowing in the contact exceeds a predetermined level and the total time that must accumulate before the combination of current and time is in the 4TCR.

6. The DC circuit breaker of claim 2, wherein the controller includes a level detector configured to detect when the sensed DC current exceeds a predetermined maximum level and, in response thereto, to cause the contact to switch from the closed state to the open state.

7. A method of controlling a DC circuit breaker comprising:
   (a) sensing a level of DC current flowing in at least one contact of the DC circuit breaker in a closed state;
   (b) accumulating an indication of the total time the DC current in step (a) is sensed;
   (c) comparing the accumulated indication in step (b) to a predetermined value or level; and
   (d) in response to the accumulated indication in step (b) exceeding the predetermined value or level, causing the at least one contact to switch from the closed state to an open state, wherein the accumulated indication is an accumulated charge on a capacitor, and the capacitor is charged with current from a current source and the value of the charging current is based on the level of the DC current sensed in step (a).

8. The method of claim 7, wherein step (b) includes accumulating the indication of the total time the DC current in step (a) is sensed only when the level of the DC current exceeds a predetermined value.

9. The method of claim 7, wherein at least one of steps (b), (c), and (d) is performed under the control of a programmed digital controller.

10. The method of claim 9, wherein the programmed digital controller includes one of the following operating under the control of computer readable program code:
    a microprocessor; or
    a digital signal processor (DSP).

11. The method of claim 7, further including:
    (e) causing the at least one contact to switch from the closed state to the open state in response to a temperature of the DC circuit breaker exceeding a predetermined temperature.

12. The method of claim 7, further including:
    (e) causing the at least one contact to switch from the closed state to the open state in response to a magnetic field produced by the DC current flowing in at least one contact exceeding a predetermined value.

* * * * *